United States Patent
Siwiak et al.

[11] Patent Number: 5,668,923
[45] Date of Patent: Sep. 16, 1997

[54] VOICE MESSAGING SYSTEM AND METHOD MAKING EFFICIENT USE OF ORTHOGONAL MODULATION COMPONENTS

[75] Inventors: Kazimierz Siwiak, Coral Springs; Sunil Satyamurti, Delray Beach; William Joseph Kuznicki, Coral Springs, all of Fla.

[73] Assignee: Motorola, Inc., Schaumburg, Ill.

[21] Appl. No.: 396,306

[22] Filed: Feb. 28, 1995

[51] Int. Cl.$^6$ .................. G10L 3/02; G10L 9/00; H04H 5/00
[52] U.S. Cl. .................. 704/204; 381/15; 381/16; 704/500; 704/503
[58] Field of Search .................. 395/2.13, 2.2, 395/2.1, 2.91–2.94; 381/29–31, 34, 15, 16; 375/261, 298

[56] References Cited

U.S. PATENT DOCUMENTS

| | | | |
|---|---|---|---|
| 3,217,256 | 11/1965 | Palatinus | 381/16 |
| 3,803,490 | 4/1974 | Almering et al. | 381/16 |
| 4,124,779 | 11/1978 | Berens et al. | 381/16 |
| 4,377,725 | 3/1983 | Hershberger | 381/15 |
| 4,520,498 | 5/1985 | Hreshberger | 381/16 |
| 4,839,923 | 6/1989 | Kotzin | 381/31 |
| 4,955,072 | 9/1990 | Tomljenovic | 381/16 |
| 5,068,898 | 11/1991 | Dejmek et al. | 381/29 |
| 5,175,769 | 12/1992 | Hejna, Jr. et al. | 381/34 |
| 5,216,744 | 6/1993 | Alleyne et al. | 395/2 |
| 5,305,384 | 4/1994 | Ashby et al. | 380/29 |
| 5,502,744 | 3/1996 | Marshall | 375/259 |

*Primary Examiner*—Allen R. MacDonald
*Assistant Examiner*—Patrick N. Edouard
*Attorney, Agent, or Firm*—Aaron B. Bernstein; D. Andrew Floam

[57] ABSTRACT

A modulation scheme (600) useful in a voice paging system in which both of two orthogonal modulation components (500 and 510) are used to carry two halves of a single voice message destined for a receiver, or two separate voice messages for a receiver. The single voice message is transmitted in half the time.

19 Claims, 12 Drawing Sheets

VOICE MESSAGING SYSTEM AND METHOD MAKING EFFICIENT USE OF ORTHOGONAL MODULATION COMPONENTS

FIELD OF THE INVENTION

The present invention relates to paging systems, and more particularly to a voice paging system and method utilizing components in an orthogonal modulation scheme.

BACKGROUND OF THE INVENTION

In a radio frequency (RF) communication system suitable for transmitting voice messages to portable or other receivers, such as selective call receivers (e.g., pagers), single sideband modulation techniques are employed for reasons of spectrum efficiency. Presently, only one of the upper or lower sidebands is used for carrying information to the receiver. Demodulating and reconstructing a message that is sent entirely on the upper or lower sideband requires that the receiver sample both the in-phase (I) component and the quadrature (Q) component of the signal for the duration of the message on the channel. Both sidebands are recovered, but the message is contained in only one of the sidebands. The information in the other sideband is discarded.

That only one of the sidebands actually carries the message is inefficient use of "air" time resulting in "traffic" inefficiencies on the assigned RF band. Furthermore, this is inefficient use of the receiver processing power and needlessly consumes battery energy in a portable receiver device.

DETAILED DESCRIPTION OF THE DRAWINGS

Figure 1:
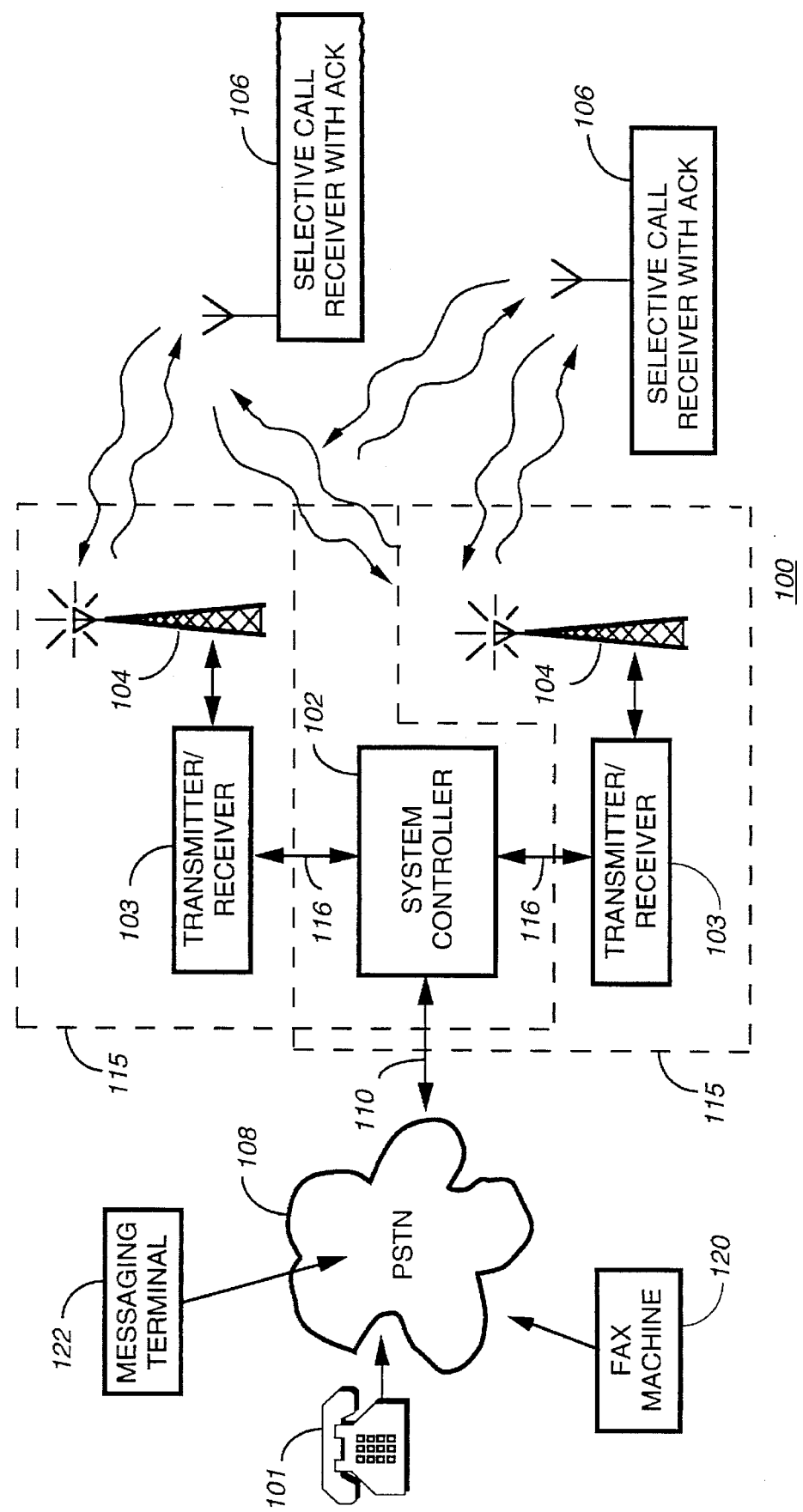
FIG. 1 is a diagram of a selective call communication system according to the present invention.

Referring to FIG. 1, an electrical block diagram of a radio communication system 100 is shown in accordance with the preferred embodiment of the present invention. The radio communication system 100 comprises a message input device, such as a conventional telephone 101, a facsimile machine 120 or a messaging terminal 122, connected through a conventional switched telephone network (PSTN) 108 by conventional telephone links 110 to a system controller 102. The system controller 102 oversees the operation of a plurality of radio frequency transmitter/receivers 103, through one or more communication links 116, which typically are twisted pair telephone wires, and additionally can include RF, microwave, or other high quality communication links. The system controller 102 encodes and decodes inbound and outbound telephone addresses into formats that are compatible with land line message switch computers. The system controller 102 also functions to encode and schedule outbound messages, which can include such information as analog voice messages, digital numeric messages, and response commands, for transmission by the radio frequency transmitter/receivers 103 to a plurality of selective call receivers 106, also called selective call radios to indicate that these devices have a transmit or "ack-back" capability. The system controller 102 further functions to decode inbound messages, including unsolicited and response messages, received by the radio frequency transmitter/receivers 103 from the plurality of selective call receivers 106.

Examples of response messages are acknowledgments and designated response messages. An acknowledgment is a response to an outbound message initiated at the system controller 102. An example of an outbound numeric message intended for a selective call radio 106 is an numeric page message entered from the telephone 101. An example of an outbound analog message intended for a selective call radio 106 is a voice page message entered from the telephone 101. For these examples, the acknowledgment indicates successful reception of the outbound numeric or analog message. A designated response message is a message sent from a selective call radio in response to a command included in an outbound message from the system controller 102. An example of a designated response message is a message initiated by the selective call radio 106, but which is not transmitted until after a designated response command is received from the system controller 102. The designated response command, in turn, is sent by the system controller 102 after an inbound message requesting permission to transmit the designated response message is communicated from the selective call radio 106 to the system controller 102. The response messages are preferably transmitted at a time designated within the outbound message or command, but alternatively can be transmitted using a non-scheduled protocol, such as the ALOHA or slotted ALOHA protocol, which are well known to one of ordinary skill in the art. An unsolicited message is an inbound message transmitted by a selective call radio 106 without having received an outbound message which requires a response. An example of an unsolicited message is an inbound message from a selective call radio 106 which alerts the radio communication system 100 that the selective call radio 106 is within radio range of the radio communication system 100. An unsolicited message can include a request to transmit a designated response and can include data such as numeric data. Unsolicited messages are transmitted using an ALOHA or slotted ALOHA protocol. The inbound and outbound messages are included in outbound radio signals transmitted from, and inbound radio signals received by, a conventional antenna 104 coupled to the radio frequency transmitter/receiver 103. The radio communication system 100 is further characterized as comprising a plurality of fixed sites 115, each fixed site comprising the system controller 102, one of the radio frequency transmitter/receivers 103, the communication link 116 coupling the system controller 102 to the radio frequency transmitter/receiver 103, and the antenna 104.

It should be noted that the system controller 102 is capable of operating in a distributed transmission control environment that allows mixing conventional cellular, simulcast, satellite, or other coverage schemes involving a plurality of radio frequency transmitter/receivers 103, conventional antennas 104, for providing reliable radio signals within a geographic area as large as a worldwide network.

Each of the selective call radios 106 assigned for use in the radio communication system 100 has at least one address assigned thereto which is a unique selective call address. The selective call address enables the transmission of a message from the system controller 102 only to the addressed selective call radio 106.

Figure 2:
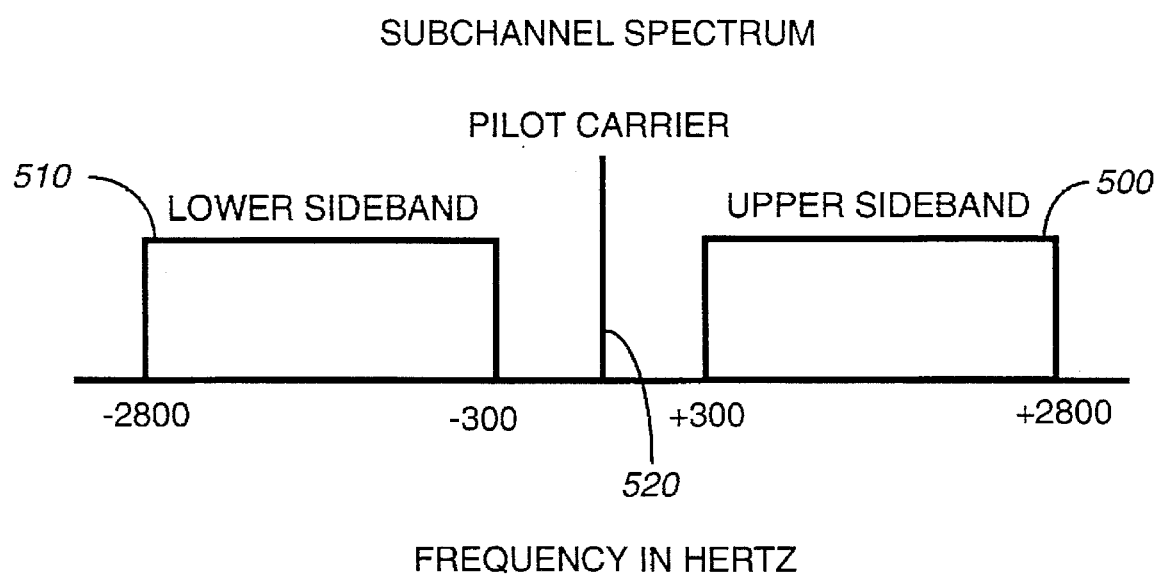
FIG. 2 is a diagram illustrating a subchannel spectrum in accordance with the present invention.

In accordance with the present invention, voice messages are transmitted in one of a plurality of sub-channels. FIG. 2 illustrates a single sub-channel. In the preferred embodiment, there are three sub-channels in a radio frequency (RF) channel, and the RF channel has a width of, for example, 25 kHz. Alternatively, seven sub-channels could be used in a 50 kHz channel, and it is readily evident to one skilled in the art that other numbers of sub-channels could be used depending on the bandwidth of the channel. The sub-channels are separated by 6250 Hz. Each sub-channel has an upper sideband 500, a lower sideband 510, and a pilot carrier 520. As will become apparent hereinafter, the sidebands 500 and 510 are used to carry portions of a single message, or two separate messages. The spectrum allocation for voice in one sub-channel is 2500 Hz, which contains the voice bandwidth of 300 to 2800 Hz.

Figure 3:
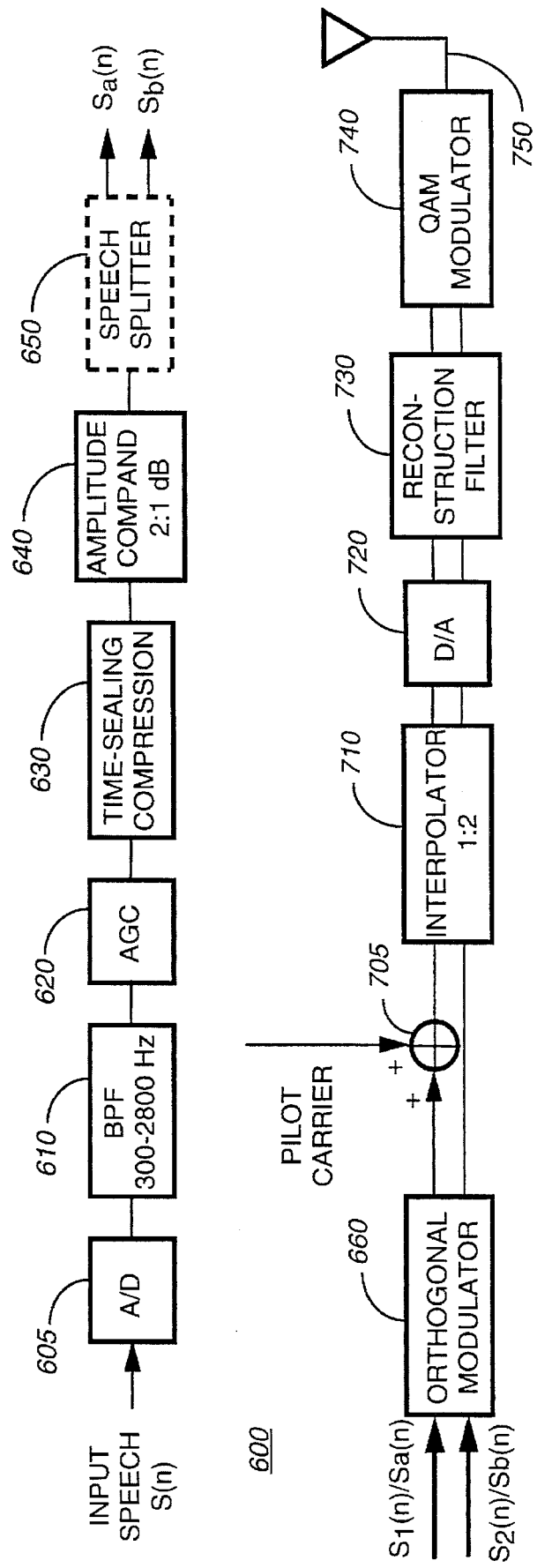
FIG. 3 is a block diagram of a transmitter according to the present invention.

FIG. 3 illustrates the transmission process 600 in accordance with the present invention by which messages, and particularly, analog voice messages, are transmitted. This process is performed preferably by the transmitter/receiver 103, but alternatively is performed by the system controller 102. In any event, the information ultimately transmitted is incorporated within a signaling protocol to be described hereinafter in conjunction with FIGS. 15-17.

An incoming speech message S(n) is received through a telephone line, for example, by the system controller 102. If, for example, the telephone line is a T1 line, then the speech is encoded using 64 kbps pulse code modulation (PCM) and it is converted to linear 16 bit PCM at an 8 kHz sampling rate by the A/D converter 605. Regardless of type, a speech message on a conventional analog telephone line is digitized by the A/D converter 605 into an appropriate digitized format. Next, the digitized speech information is processed by the bandpass filter (BPF) 610 which filters out frequencies outside the typical voice spectrum of 300-2800 Hz. The filtered digitized speech information is then passed through an automatic gain control (AGC) module 620 to compensate for the variability in amplitudes of the input speech, such fluctuations being generated, for example, when a person speaks into a handset of a telephone, cordless telephone, cellular telephone, etc. The AGC module 620 improves intelligibility and also ensures that the pilot carrier energy which is added is always below a certain fraction of the signal energy present in the transmitted signal. An AGC scheme which has a fast attack time constant of approximately 2.5 msec, for example, and a slow decay time constant of 2 sec, for example, is useful in keeping the speech energy constant among a wide sample range of voices without distorting speech characteristics. These parameters are not meant to be restrictive.

The digitized speech information is next time-scale compressed by time-scale compressor 630. Any number of time-scale compression schemes are useful. The digitized speech information is then passed through the amplitude compander 640, which compands at approximately a 2:1 dB ratio, for example, to protect against channel noise.

An orthogonal modulation scheme is employed which comprises first and second orthogonal modulation components. In accordance with one embodiment of the present invention, the first and second orthogonal modulation components are used to carry segments of a single voice message. According to another embodiment, the first and second orthogonal modulation components are used to carry first and second separate speech messages. In either embodiment, the first and second orthogonal modulation components are, for example, either the upper and lower sidebands 500 and 510, respectively, or the in-phase (I) and quadrature-phase (Q) components (also called "channels"), respectively. Furthermore, no matter which scheme is used, the invention contemplates orthogonally modulating first and second orthogonal components with first and second message portions, respectively, to generate first and second orthogonally modulated components.

A speech splitter module 650 is used if a single message is to be carried by both the first and second orthogonal modulation components. The output of the speech splitter module 650 are first and second speech message portions temporally comprising the speech signal S(n). The speech message portions are denoted Sa(n) and Sb(n), respectively. However, if two separate messages are to be modulated onto the first and second orthogonal modulation components, the speech splitter module 650 is not used and the two voice messages S1(n) and S2(n) are each processed, in parallel, by modules 600-640 and 600'-640' (identically to modules 600-640, but not shown) before proceeding to subsequent modules.

The single voice message S(n) is temporally split into first and second message portions Sa(n) and Sb(n) by the speech splitter module 650. The speech splitter module 650, in the case of digital information, separates a table of numbers representing the processed speech message S(n) into two, at a point, such as a zero crossing or another convenient temporal occurrence, somewhere near the temporal midpoint of the speech message S(n).

Next, the speech message portions Sa(n) and Sb(n) (or speech messages S1(n) and S2(n) as the case may be) are passed through a orthogonal modulator 660 which modulates the speech message portions onto first and second orthogonal modulation components. The orthogonal modulator 660 is described in more detail hereinafter.

Next, the pilot carrier is added by summer 705 to the output of orthogonal modulator 660. The pilot carrier has an amplitude of approximately 0.15 times the maximum amplitude in the speech information.

Prior to this point in transmitter processing, the modules operate at, for example, an 8 kHz sampling rate. When this is ultimately converted to analog information, images occur at multiples of 8 kHz. To eliminate these images, an anti-imaging filter would be needed. Consequently, to avoid this necessity, the processed signal is interpolated by an interpolator module 710 to a 16 kHz sampling rate so that the images are separated by 16 kHz. Once converted to analog information, an analog filter is used to eliminate images.

The outputs of the interpolator are next converted from digital to analog using a 16 bit D/A converter module 720. The analog output of the D/A converter module 720 is then passed through a suitable analog reconstruction (anti-imaging) filter 730 to remove all images, leaving only the baseband SSB signal.

A quadrature amplitude (QAM) modulation module 740 is coupled to the output of the reconstruction filter 730 to modulate the SSB signal to the proper sub-channel which is transmitted via an antenna 750.

Figure 4:
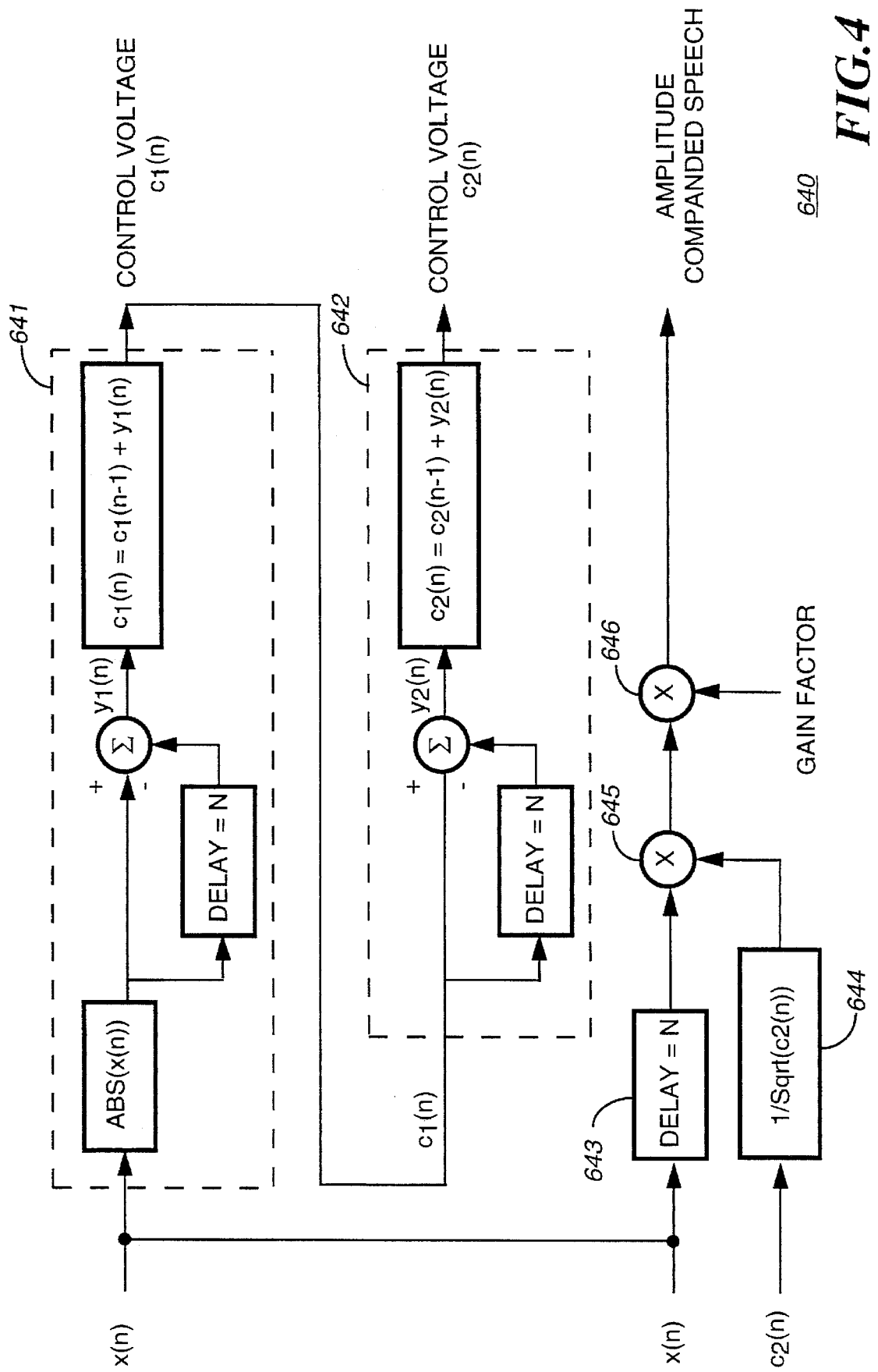
FIG. 4 is a diagram of an amplitude compander module in the transmitter according to the present invention.

FIG. 4 illustrates in detail the amplitude compander module 640. As is known in the art, amplitude companding involves boosting low amplitude components and compressing high amplitude components of a signal. This protects the low amplitude components from the effect of any channel noise and thus provides better intelligibility and quality.

The amplitude compander 640 generates a control voltage factor c2(n) by computing the mean absolute value of the signal averaged over N samples. This is achieved by using two moving average filters. The first moving average filter 641 computes the mean absolute value of N input samples and the second moving average filter 642 computes the N sample average of the mean absolute values obtained from the output of the first moving average filter 641.

In delay module 643, the input signal is delayed by N−1 samples and the output amplitude companded signal is computed by the equation:

$$(\text{Delayed Sample} \times \text{Compressor Gain Factor})/(\text{Control Voltage } c2(n))^{1/2}.$$

In the implementation shown in FIG. C, N=48 and the Gain Factor=0.140625XN. Preferably, and though not shown in FIG. 4, the amplitude companded signal is band-pass filtered again with a 300–2800 Hz bandpass filter to eliminate harmonics that might have been introduced due to companding. A filter similar to the BPF 610 is useful.

Figure 5:
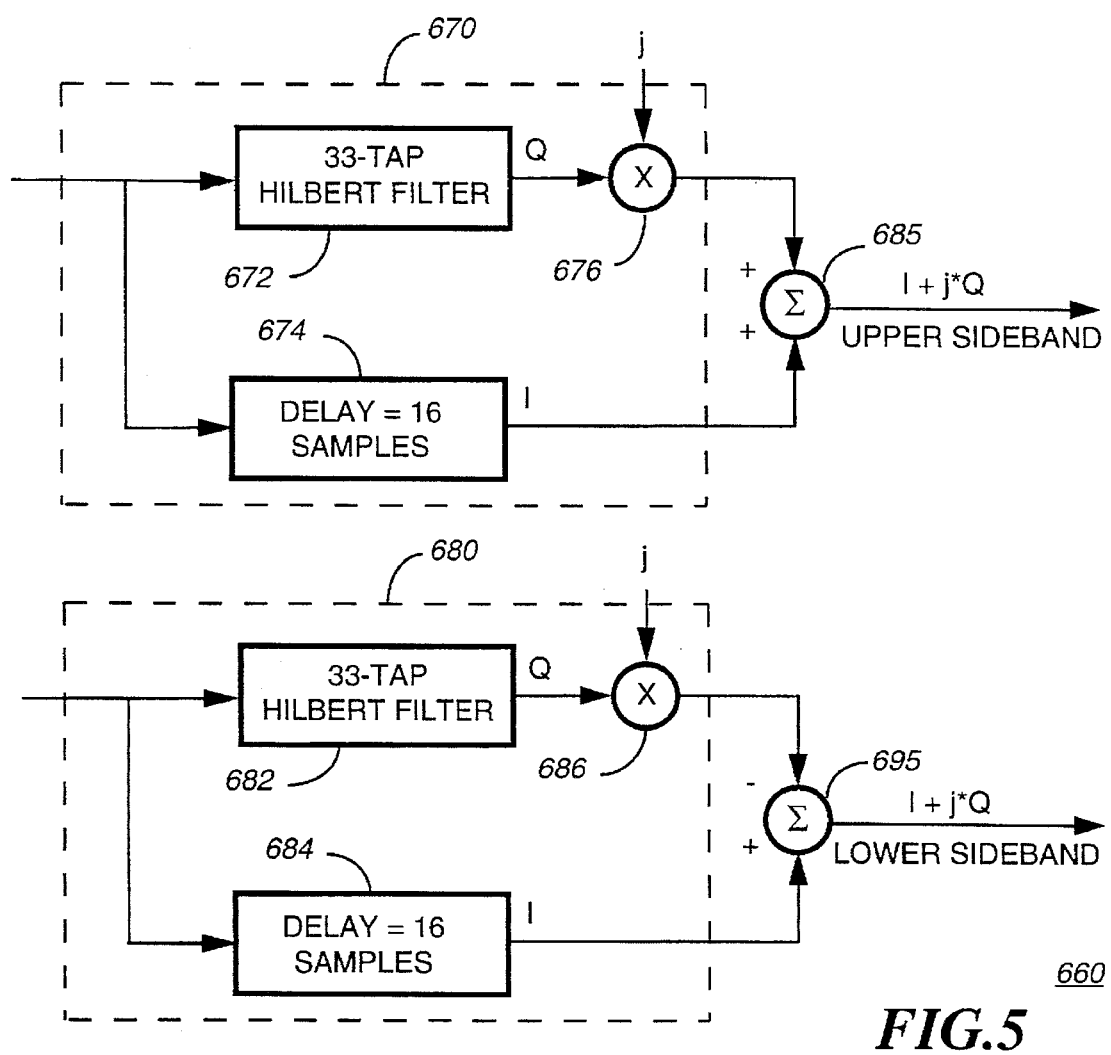
FIG. 5 is a block diagram of one orthogonal modulator according to the present invention.
Figure 6:
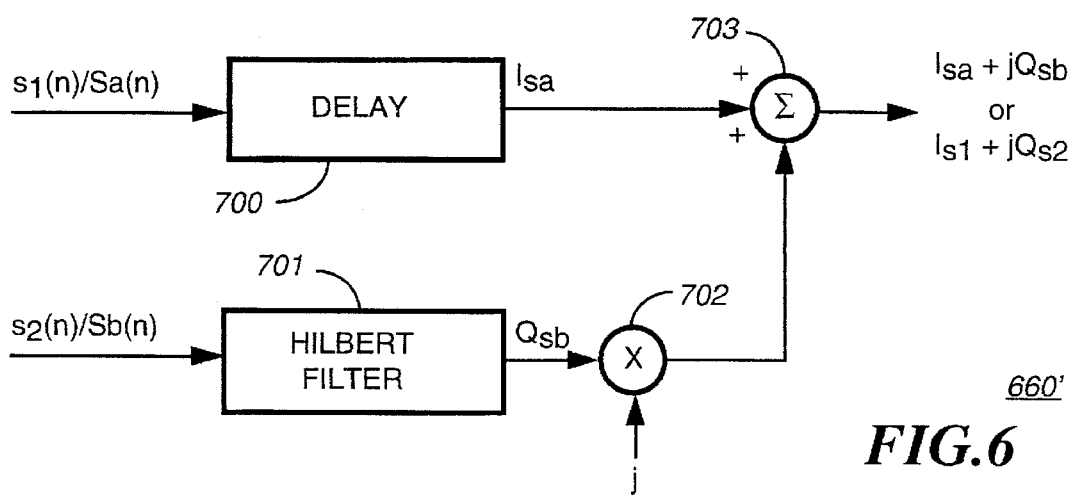
FIG. 6 is a block diagram of another orthogonal modulator according to the present invention.

FIGS. 5 and 6 illustrate two examples of implementations of the orthogonal modulator 660. In FIG. 5, the speech message portions modulate upper and lower sidebands, whereas in FIG. 6, the speech message portions modulate I and Q components.

First, in FIG. 5, the orthogonal modulator 660 comprises first and second Hilbert transform modules 670 and 680, respectively. The Hilbert transform modules 670 and 680 each comprise a 33-tap Hilbert filter 672 and 682, respectively, a 16-sample delay module 674 and 684, respectively, and a multiplier 676 and 686, respectively. The 33-tap Hilbert filters 672 and 682 generate the Q components and the 16-sample delay modules 674 and 684 generate the I components. The multipliers 676 and 686 generate 90 degree phase shifts as is necessary for the Q component. The upper sideband I+j*Q is generated by the summer 685 and the lower sideband I−j*Q is generated by the summer 695.

In FIG. 6, on the other hand, a different configuration of the orthogonal modulator is shown at 660'. In this configuration, the orthogonal modulator 660' includes a delay module 700, similar to delay module 674, and a Hilbert filter 701, similar to filter 672. The speech message portion Sa(n) (or Sl(n)) is passed through the delay module 700 and the speech message portion Sb(n) (or Sl(n)) is passed through the Hilbert filter 701. The output of the Hilbert filter is coupled to the multiplier 702 for a 90 degree phase shift. In summer 703, the output of the delay module 700 is added to the output of the multiplier 702. Thus, the output of the summer 703 comprises the message portion Sa(n) modulated onto the I component and the message portion Sb(n) modulated onto the Q component; or in the case of the second embodiment, message portion Sl(n) modulated onto the I component and message portion S2(n) modulated onto the Q component.

Figure 7:
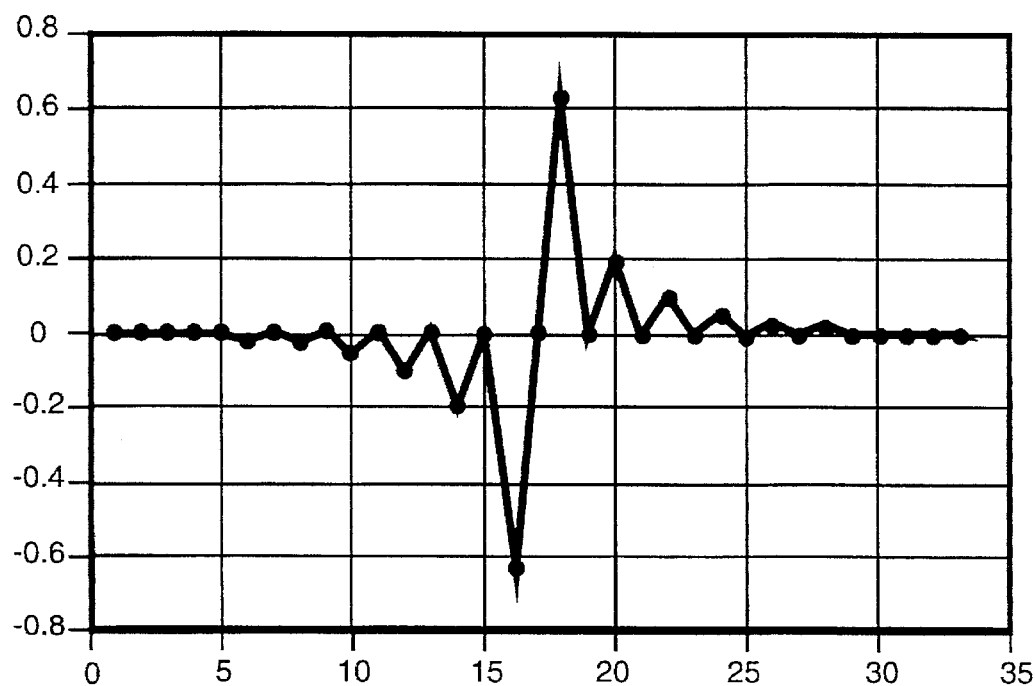
FIG. 7 is a diagram illustrating the impulse response of a Hilbert filter in accordance with the present invention.

FIG. 7 illustrates, as an example, a suitable impulse response of the 33-tap Hilbert filters 672, 682 and 701.

Figure 8:
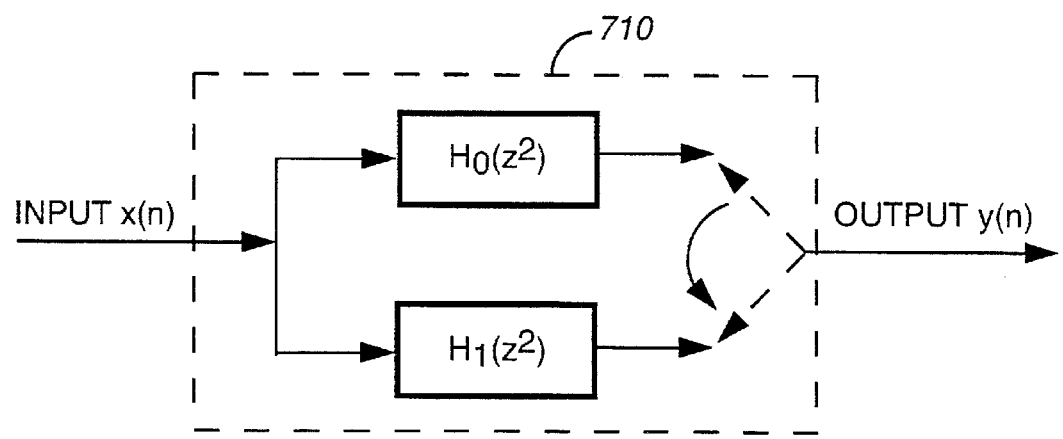
FIG. 8 is a polyphase diagram of the interpolation module of the transmitter according to the present invention.
Figure 9:
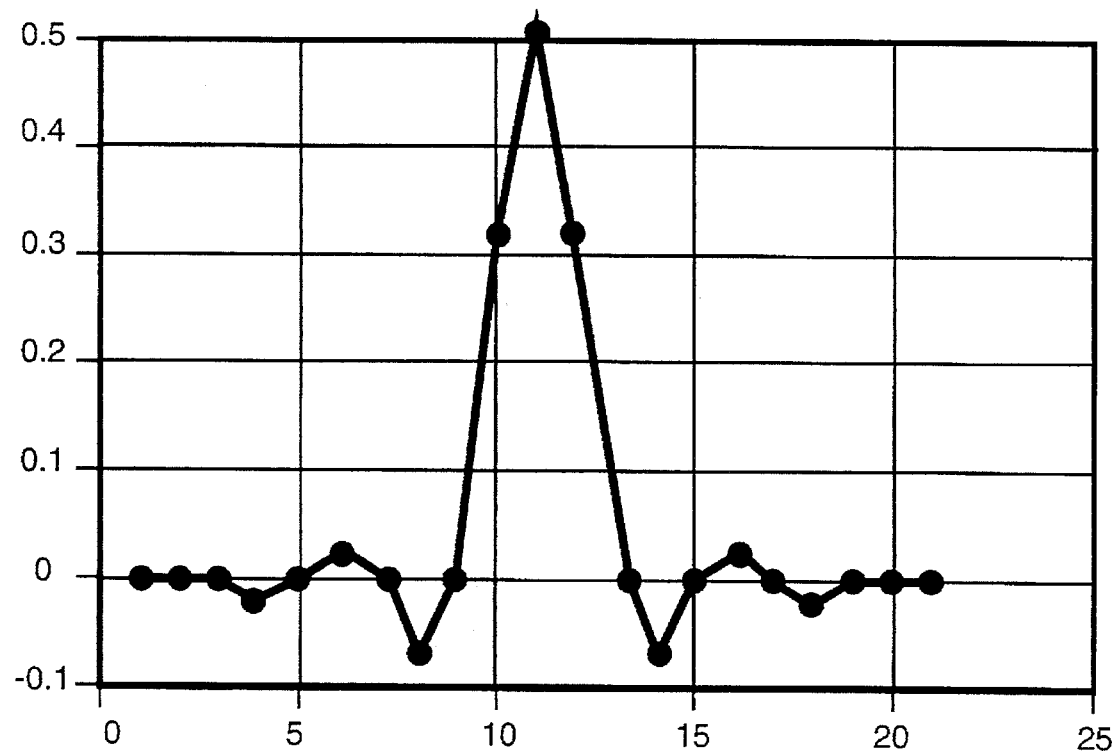
FIG. 9 is a diagram of an impulse response of an interpolation filter in the interpolation module.

FIG. 8 is a polyphase representation of an example of a suitable interpolator module 710, well known in the art, and FIG. 9 is an impulse response of the interpolator module 710. As shown in FIG. 9, every alternate sample is zero, which reduces computational complexity. In addition, the frequency response of the filter has a pass-band at 0–3 kHz and an attenuation of 60 dB at 5,600 Hz. In FIG. 8, $H_o(z^2)=h_0+z^{-1}h_2+z^{-2}h_4 + \ldots$; and $H_1=z^{-1}[h_1+z^{-1}h_3z^{-2}h_5+ \ldots]$. Taking advantage of the alternating zeros in the impulse response and polyphase representation, computations are reduced to 6 multiplies per sample at 16 kHz sampling rate for one channel (I or Q), which is a substantial improvement over 21 multiplies per sample at 16 kHz in a direct implementation.

Figure 10:
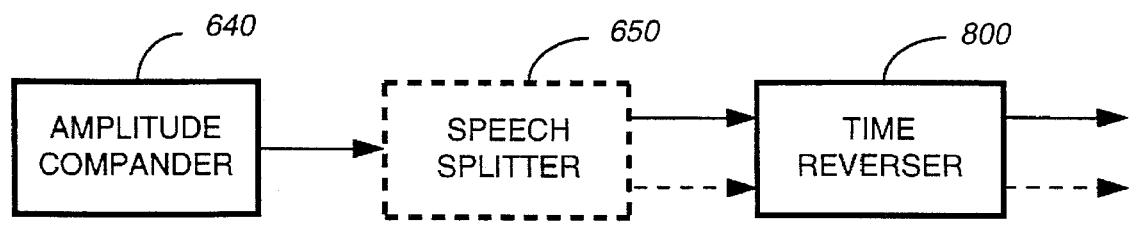
FIG. 10 is a block diagram illustrating use of a time reverser module in the transmitter according to the present invention.

Optionally, none, one or both message portions are time-reversed prior to modulation by the orthogonal modulator 660 (or 660'). FIG. 10 illustrates an optional time reverser module 660 which is coupled to the output of the speech splitter 650 if a single message is transmitted, or to the output of the amplitude compander 640, if two separate message portions are transmitted. The time reverser module 800 temporally reverses the message portion so that it is transmitted backwards in time. In the case of digital implementation of the present invention, the time reverser module 800 reads a sequence of numbers from last to first, from the output of the speech splitter 650 or the amplitude compander 640. For example, the time reverser module 800 is a software cottoter decrementing from the highest index downward as will be described hereinafter.

By time reversing the message portions, the transmitted voice information is "scrambled" and thus has a low level of security or privacy in that the time reversed portion of the speech signal will not be "readable" or intelligible to a receiver casually monitoring the channel. Thus, only receivers that, a priori, know that the transmitted voice information is time reversed can demodulate and render intelligible the transmitted signal. It is appreciated that the decision to time reverse to not time reverse can be made within a signalling protocol on a frame by frame basis based on a pre-arranged sequence known at the transmitter and at the receiver. One example of a sequence known to both the transmitter and the receiver is the binary encoded address of the selective cal receiver. Furthermore, in the case where the I and Q channels are modulated, the simultaneous overlapping in spectrum on the channel of two voice portions, one, or both, time reversed, obscures the intelligibility to a casual monitoring receiver.

Figure 11:
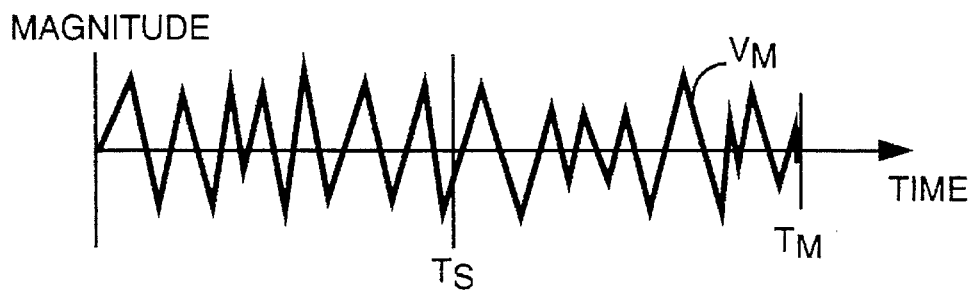
FIG. 11 is a plot diagram illustrating a voice message.
Figure 12:
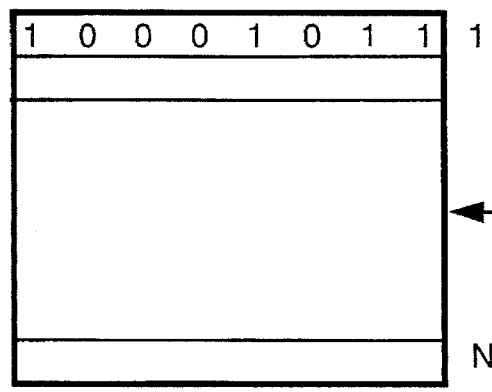
FIG. 12 is a diagram depicting a digital representation of the voice message shown in FIG. 11.
Figure 13:
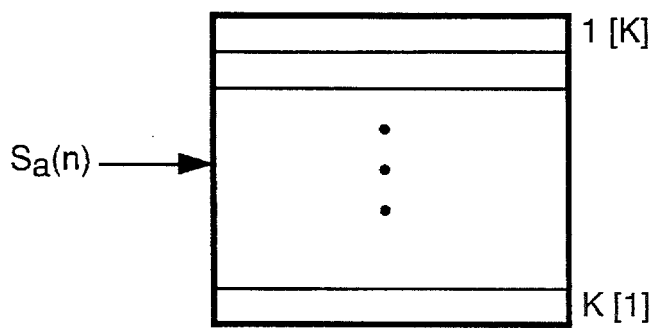
FIGS. 13 and 14 are diagrams depicting digital representations of two halves of the voice message of FIG. 11.
Figure 14:
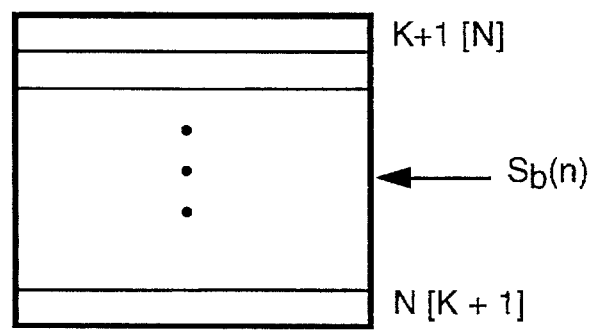

With reference to FIGS. 11–14, an example of transmitting a speech message according to the present invention is described. As shown in FIG. 11, a voice message Vm is shown as having a time duration of Tm. When sampled and digitized by the A/D conversion module 605, the voice message S(n) is defined by a sequence of digital numbers 1 through N which are digital representations of the samples shown in FIG. 12. The digital representation of the voice message Vm is split into two by the speech splitter 650. A preferred point to separate the voice message is at a zero point at time Ts. Thus, the digital value of sample k is the value of the voice message at time Ts. The first message portion Sa(n) comprises the digital values for samples 1 through k and the second message portion Sb(n) comprises the digital values for samples k+1 through N, as shown in FIGS. 13 and 14, respectively. Either or both of the first and second message portions are optionally time reversed and the brackets in FIGS. 13 and 14 indicate the order of digital values if each message portion is time reversed.

If the upper and lower sidebands 500 and 510 are used for carrying the message portions, the upper sideband 500 is formed with one of the message portions, such as the first portion using the Hilbert transform module 670. The upper sideband carrying the first message portion is represented by the expression $I_{Sa}+jQ_{Sa}$. Similarly, the lower sideband carrying the second message portion (time reversed or not) is represented by the expression $I_{Sb}-jQ_{Sb}$, generated by the Hilbert transform module 680. Thus, referring to FIG. 2, the first and second message portions Sa(n) and Sb(n) are carried by the upper and lower sidebands 500 and 510. Consequently, a voice message having a duration Tm is transmitted in half the time because half of the message is carried by the upper sideband 500 and the other half is carried by the lower sideband 510.

As will become apparent hereinafter, the receiver normally detects both sidebands, especially if the receiver uses digital signal processing, but ignores one of the sidebands. If the message is time compressed at the outset, both sidebands can be used to transmit a message in half the transmission or "air" time. Moreover, the receiver receives the same message in half the time, consuming less power because the power consuming decoding circuitry is activated for only half the time.

Likewise, the upper and lower sidebands 500 and 510 optionally carry two separate messages. In this case, message one Sl(n) is represented as $I_{S1}+jQ_{S1}$ and message two S2(n) is represented as $I_{S2}-jQ_{S2}$, at the output of the Hilbert transform modules 670 and 680, respectively.

Figure 15:
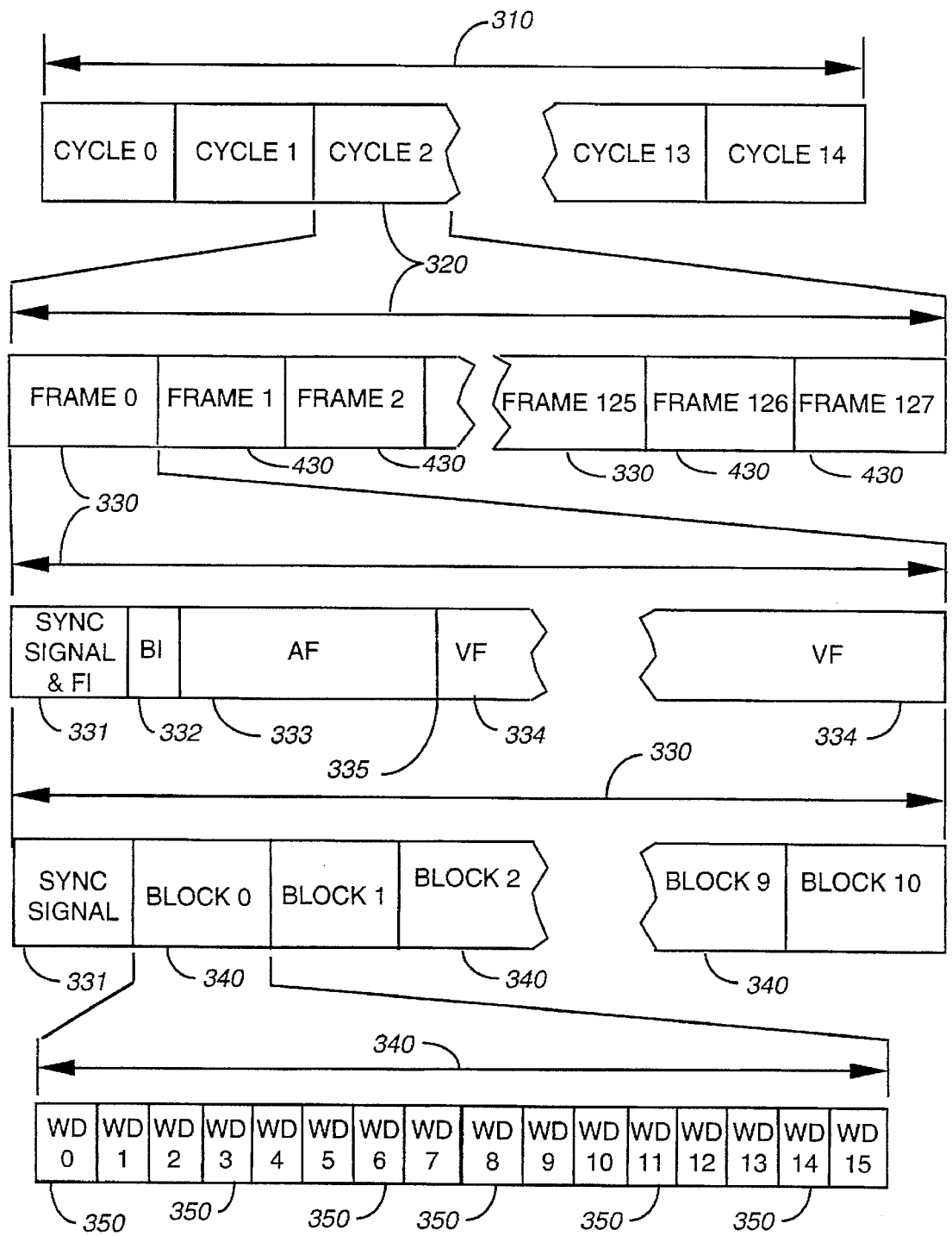
FIGS. 15–17 are timing diagrams illustrating an example of a signaling protocol in accordance with the present invention.
Figure 16:
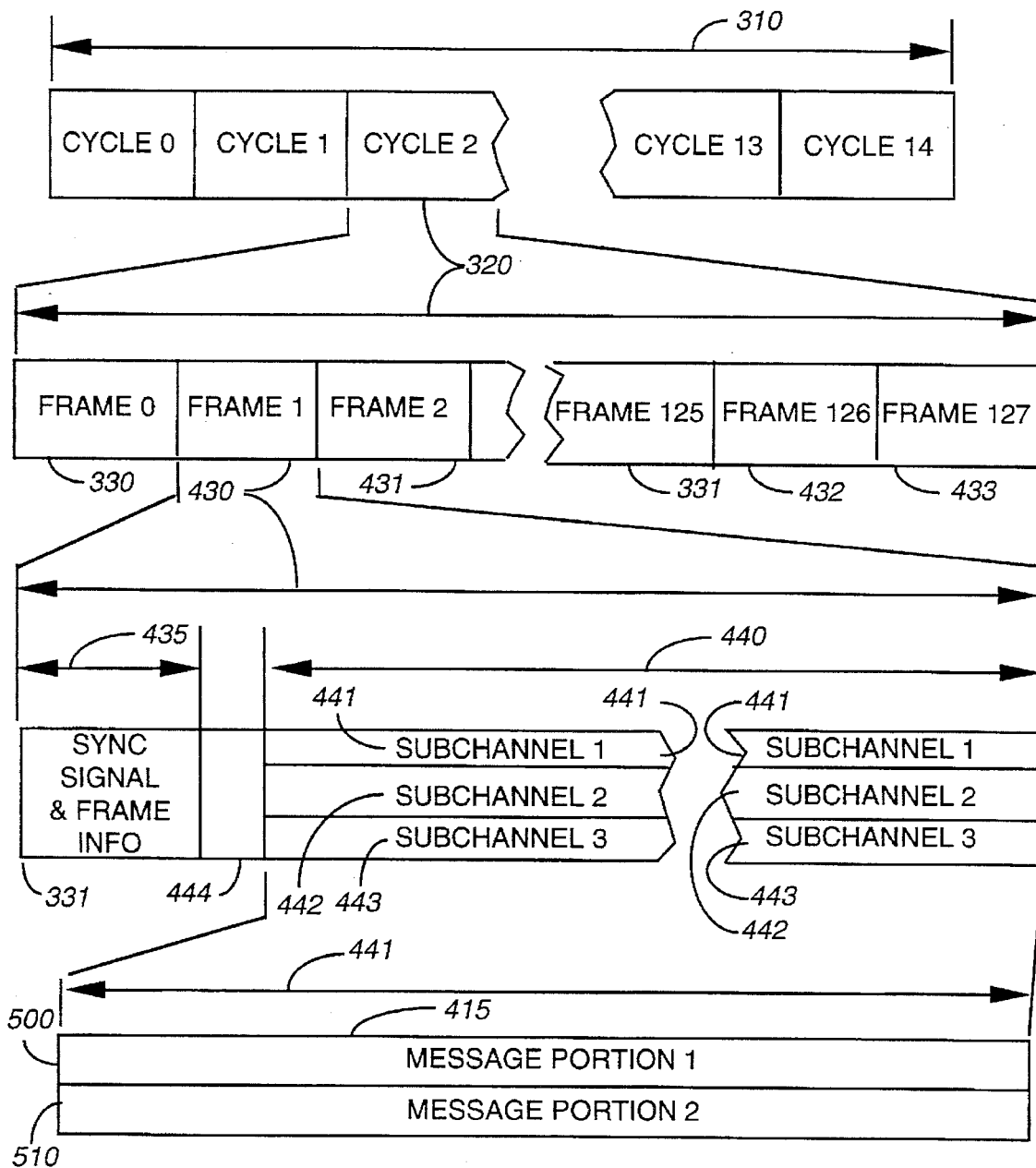
Figure 17:
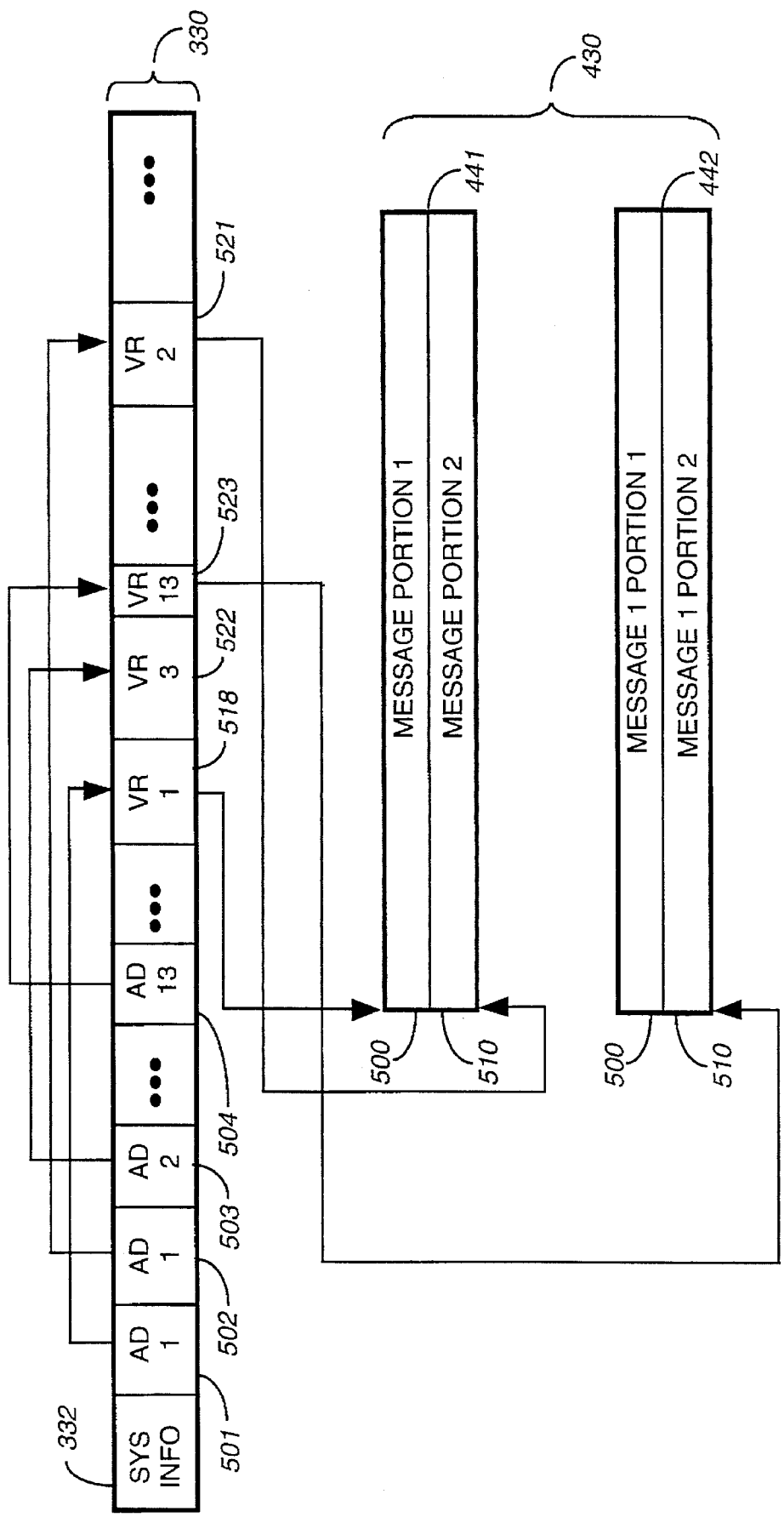

In the case of a paging systems, the voice message portions are transmitted in accordance with a protocol. One such protocol is shown in FIGS. 15–17. Referring to FIG. 15, a timing diagram is shown which illustrates features of an example of a transmission coding format of an outbound signaling protocol utilized by the radio communication system 100 of FIG. 1, and which includes details of a control frame 330, in accordance with the preferred embodiment of the present invention. Control frames 330 are also classified as digital frames 330.

The signaling protocol is subdivided into protocol divisions, which are an hour 310, a cycle 320, frames 330, 430 a block 340, and a word 350. Up to fifteen 4 minute uniquely identified cycles are transmitted in each hour 310. Normally, all fifteen cycles 320 are transmitted each hour. Up to one hundred twenty eight 1.875 second uniquely identified frames including control frames 330 and analog frames 430 (described below with reference to FIG. 8) are transmitted in each of the cycles 320. Normally, all one hundred twenty eight frames are transmitted. One synchronization and frame information signal 331 lasting one hundred fifteen milliseconds and 11 one hundred sixty millisecond uniquely identified blocks 340 are transmitted in each of the control frames 330. Bit rates of 3200 bits per second (bps) or 6400 bps are usable during each control frame 330. The bit rate during each control frame 330 is communicated to the selective call radios 106 during the synchronization signal 331. When the bit rate is 3200 bps, 16 uniquely identified 32 bit words are included in each block 340, as shown in FIG. 6. When the bit rate is 6400 bps, 32 uniquely identified 32 bit words (not shown) are included in each block 340. In each 32 bit word, at least 11 bits are used for error detection and correction, and 21 bits or less are used for information, in a manner well known to one of ordinary skill in the art. The bits and words 350 in each block 340 are transmitted in an interleaved fashion using techniques well known to one of ordinary skill in the art to improve the error correction capability of the protocol.

Information is included in each control frame 330 in information fields, comprising frame structure information in a block information field (BI) 332, one or more selective call addresses in an address field (AF) 333, and one or more vectors in a vector field (VF) 334. The vector field 334 starts at a vector boundary 334. Each vector in the vector field 334 corresponds to one of the addresses in the address field 333. The boundaries of the information fields 332, 333, 334 are defined by the block information field 332 and information fields 333, 334 which are variable, depending on factors such as the type of system information included in the sync and frame information field 331 and the number of addresses included in the address field 333, and the number and type of Vectors included in the vector field 334.

Referring to FIG. 16, a timing diagram is shown which illustrates features of the transmission format of the outbound signaling protocol utilized by the radio communication system of FIG. 1, and which includes details of a voice frame 430, in accordance with the preferred embodiment of the present invention. Voice frames 430 are also classified herein as analog frames 430. The durations of the protocol divisions hour 310, cycle 320, and frame 330, 430 are identical to those described with respect to a control frame in FIG. 15. Each analog frame 430 has a header portion 435 and an analog portion 440. The information in the synchronization and frame information signal 331 is the same as the synchronization signal 331 in a control frame 330. As described above, the header portion 435 is frequency modulated and the analog portion 440 of the frame 430, is amplitude modulated. The analog portion 440 is that portion which carries the voice message portions via one of orthogonal modulation components. FIG. 16 shows that the radio communication system includes three subchannels, each having a pilot sub-carrier similar to that depicted in FIG. 1, and to which the voice message portions may be assigned for transmission.

In accordance with the preferred embodiment of the present invention, the transition portion 444 includes the amplitude modulated pilot sub-carriers for at least three sub-channels 441, 442 and 443. Each sub-channel 441, 442 and 443 includes an upper sideband signal and a lower sideband signal as shown in FIG. 1, and also has associated therewith an I channel and a Q channel. In the example illustrated in FIG. 16, the upper sideband signal 500 includes one message portion 415, which is a first portion of a first voice message, and in the lower sideband 510 is a second portion of, for example, the same first voice message.

In accordance with the present invention, voice messages

Referring to FIG. 17, a timing diagram illustrating a control frame 330 and two analog frames 430 of the outbound signaling protocol utilized by the radio communication system of FIG. 1 is shown, in accordance with the preferred embodiment of the present invention. The diagram of FIG. 8 shows an example of frame zero which is a consol frame 330. Four addresses 501, 502, 503 and 504 and four vectors 518, 521, 522, 523 which are in frame zero are illustrated. Two addresses 501, 502 include one selective call radio 106 address, while the other two addresses 503, 504 are for a second and third selective call radio 106. Each address 501, 502, 503 and 504 is uniquely associated with one of the vectors 518, 521, 522, and 523 by inclusion of a pointer within each address which indicates the protocol position of (i.e., where the vector starts and how long it is) the associated vector. In accordance with the preferred embodiment of the present invention the vector position is provided by identifying the number of words 350 after the vector boundary 335 at which the vector starts, and the length of the vector, in words. It will be appreciated that the relative positions of the addresses and vectors are independent of each other. The relationships indicated by the pointers are illustrated by the arrows.

In the example shown in FIG. 17, control frame vectors 518, 521 and 523 are uniquely associated with a message portion in one of the subchannels 441 or 442. Specifically, vector 518 points to upper sideband 500 of subchannel 441 and vector 522 points to lower sideband 510 of subchannel 441. Similarly, vector 521 points to both sidebands of subchannel 442. That is, in the case of subchannel 441, the example shows that two different message portions are carried by the upper and lower sidebands. In the case of subchannel 442, two halves of one message portion are carried by the upper and lower sidebands, respectively. Thus, the control frame vectors 518, 521 and 523 include information therein to indicate which subchannel (i.e., which radio frequency) the receiver should look for a voice frame message, and also information to indicate whether two separate messages are to be recovered from the subchannel, or whether first and second halves of a single message are to be recovered.

In terms of the signalling protocol, the method for transmitting messages first and second messages to an addressable receiver according to the present invention involves orthogonally modulating first and second orthogonal components with first and second messages, respectively, to generate first and second orthogonally modulated components; and simultaneously transmitting the first and second orthogonally modulated components in a protocol which includes address information corresponding to an address of an addressable receiver and synchronization information suitable for triggering the addressable receiver to enter a mode suitable for simultaneously demodulating the first and second orthogonally modulated components at a particular instant of time in accordance with the synchronization information.

One use for the embodiment where two different messages are simultaneously transmitted over upper and lower sidebands (or I and Q channels), respectively, is where one message is a direct voice paging message, and the other is a voice mailbox message, which is to be stored in the pager.

Figure 18:
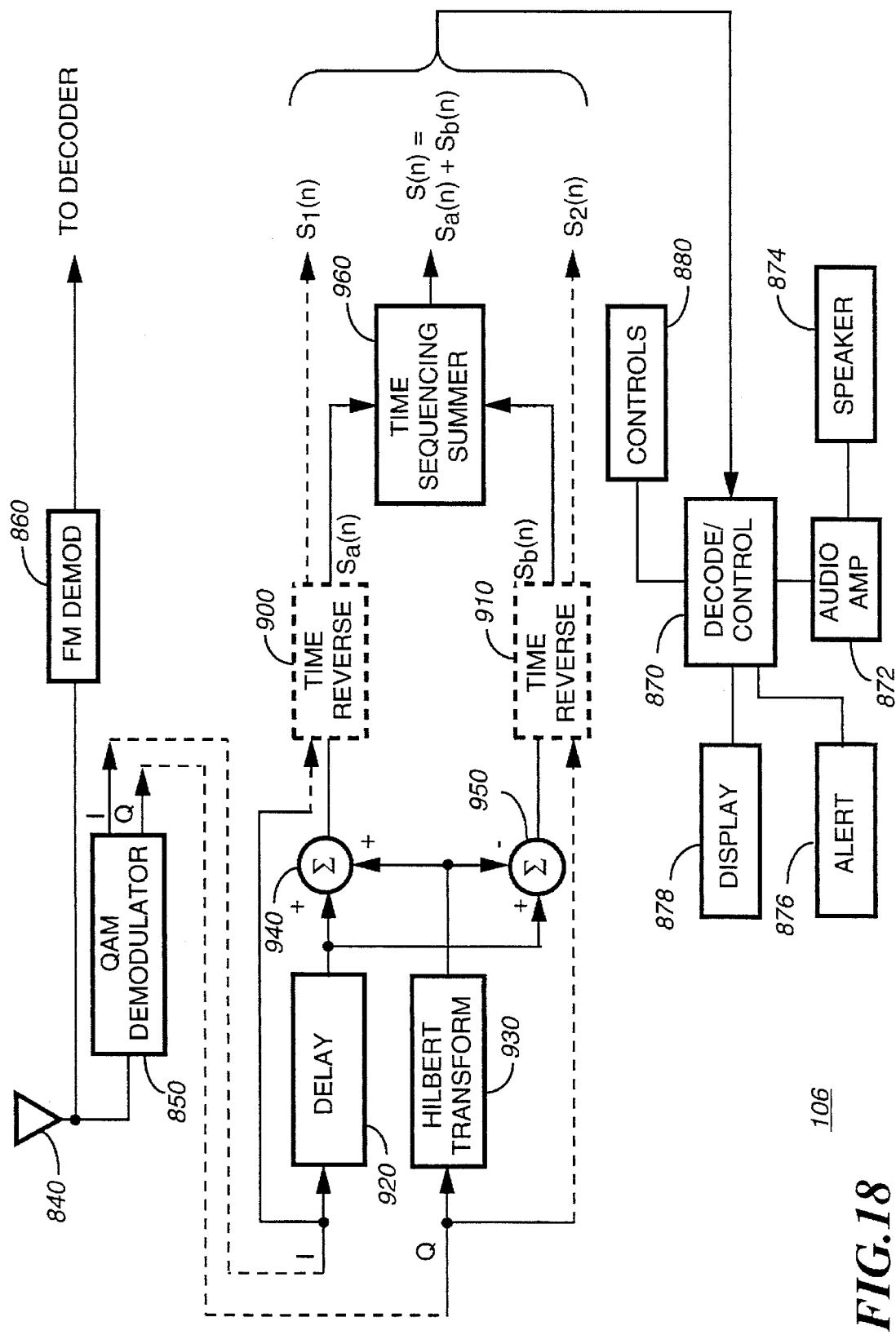
FIG. 18 is a block diagram of a receiver according to the present invention.

Turning now to FIG. 18, the selective call receiver 106 includes at least an antenna 840, a quadrature amplitude (QAM) demodulator 850, an FM demodulator 860, a decoder/controller 870 and, an audio amplifier 872, a speaker 874, an alert 876, a display 878 and controls 880. The QAM demodulator 850 performs QAM demodulation on the signal detected by the antenna 840 in order to recover the voice messages. The FM demodulator 860 performs FM demodulation recover data and other non-analog analog messages. The output of the FM demodulator 860 is a data limited signal (digital data) which is coupled to the decoder/controller 870, and includes the signaling protocol information which is decoded by the decoder/controller 870 and is responsive thereto to display or store data messages, locate the sub channel to demodulate voice messages, activate the alert 876, etc.

The voice messages are recovered through a series of processing modules which operate on the I and Q channel output of the QAM demodulator 850. The processing modules are shown at 900–960, and are, for example, implemented by firmware on a digital signal processor, or by software stored in the decoder/controller 870. In the later case, the processing modules would be performed by the decoder/controller 870.

If the message portions were modulated onto the I and Q components, the message portions are recovered directly from the output of the QAM demodulator 850. If either or both message portions were time reversed at transmission, then the recovered message portions are reversed back to the proper sequence by time reverse modules 900 and 910. As a result, message portion S1(n) is taken at the output of the time reverse module 900 and message portion S2(n) is taken at the output of the time reverse module 910.

On the other hand, if the message portions were modulated onto the upper and lower sidebands, then the I component is passed through a delay module 920 and the Q component is passed through a Hilbert transform module 930. Summer module 940 adds the output of the modules 920 and 930, and summer module 950 subtracts the output of module 930 from the output of delay module 920. The recovered message portions are passed through time reverse modules 900 and 910 if they were time reversed at transmission.

Message portions Sa(n) and Sb(n) are processed by the time sequencing summer 960 which temporally combines the message portions Sa(n) and Sb(n) to reconstruct the original message S(n).

It should be understood that the additional functions of time decompression and amplitude decompression are preferably performed to "undo" those processes performed at modulation. Thus, while not specifically shown in FIG. 18, time decompression and amplitude decompression modules are coupled to the output of the time sequencing summer 960, for example. Other post-demodulation processing suitable for enhancing the quality of the recovered signal are envisioned in accordance with the present invention.

The above description is intended by way of example only and is not intended to limit the present invention in any way except as set forth in the following claims.

What is claimed is:

1. A method for transmitting a message to a receiver comprising steps of:

temporally splitting the message into first and second message portions which are time contiguous portions of the message;

orthogonally modulating first and second orthogonal components with the first and second message portions, respectively, to generate first and second orthogonally modulated components; and simultaneously transmitting the first and second orthogonally modulated components.

2. The method of claim 1, wherein the step of orthogonally modulating comprises generating an in-phase component and a quadrature component, wherein the in-phase component is modulated by the first message portion and the quadrature component is modulated by the second message portion.

3. The method of claim 1, wherein the step of orthogonally modulating comprises generating upper and lower sidebands, wherein the upper sideband is modulated by the first message portion and the lower sideband is modulated by the second message portion.

4. The method of claim 1, wherein the first and second message portions comprise a single voice message.

5. The method of claim 1, and further comprising the step of filtering the first and second message portions to substantially eliminate frequencies outside of a normal voice spectrum.

6. The method of claim 1, and further comprising the step of time reversing at least one of said first and second message portions prior to said step of orthogonally modulating.

7. The method of claim 6, wherein the step of time reversing is applied on a frame by frame basis in a signalling protocol according to a pre-arranged sequence.

8. The method of claim 1, and further comprising the step of time compressing the first and second message portions prior to said step of orthogonally modulating.

9. The method of claim 1, and further comprising the step of amplitude companding the first and second message portions prior to said step of orthogonally modulating.

10. A method for transmitting first and second portions of a message to an addressable receiver comprising steps of:

orthogonally modulating first and second orthogonal components with first and second portions of the message, respectively, to generate first and second orthogonally modulated components, the first and second message portions being time contiguous portions of the message; and simultaneously transmitting the first and second orthogonally modulated components in a protocol which includes address information corresponding to an address of an addressable receiver and synchronization information suitable for triggering the addressable receiver to enter a mode suitable for simultaneously demodulating the first and second orthogonally modulated components at a particular instant of time in accordance with the synchronization information.

11. The method of claim 10, wherein the step of orthogonally modulating comprises generating an in-phase component and a quadrature component, wherein the in-phase component is modulated by the first portion of the message and the quadrature component is modulated by the second portion of the message.

12. The method of claim 10, wherein the step of orthogonally modulating comprises generating upper and lower sidebands, wherein the upper sideband is modulated by the first portion of the message and the lower sideband is modulated by the second portion of the message.

13. The method of claim 10, and further comprising the step of time reversing at least one of said first and second portions of the message prior to said step of orthogonally modulating.

14. A method for receiving a transmitted signal comprising first and second orthogonally modulated components comprising steps of:

demodulating the transmitted signal to obtain first and second message portions from the first and second orthogonally modulated components, respectively, the first and second message portions being time contiguous message portions of a single message; and temporally sequencing the first and second message portions to combine them in time in order to generate a single message comprised of the first and second message portions.

15. The method of claim 14, wherein the single message comprises a voice message.

16. The method of claim 14, and further comprising the step of time reversing at least one of the first and second message portions prior to the step of temporally sequencing.

17. The method of claim 14, wherein the first and second message portions are digital signals, and further comprising the step of converting the first and second message portions to analog signals.

18. The method of claim 14, wherein the step of demodulating comprises recovering the first and second message portions from an in-phase component and an quadrature-component, respectively.

19. The method of claim 14, wherein the step of demodulating comprises recovering the first and second message portions from upper and lower sidebands, respectively.

* * * * *